United States Patent [19]
Heindl et al.

[11] Patent Number: 5,147,410
[45] Date of Patent: Sep. 15, 1992

[54] PROCESS FOR THE END-TO-END DYEING OF CELLULOSIC FIBRES: DESALTED DIRECT DYE AND MIGRATION INHIBITOR

[75] Inventors: Anette Heindl, Inzlingen, Fed. Rep. of Germany; Rudolf Schaulin, Riehen, Switzerland; Thomas Stockhorst, Bocholt, Fed. Rep. of Germany

[73] Assignee: Ciba-Geigy Corporation, Ardsley, N.Y.

[21] Appl. No.: 700,001

[22] Filed: May 14, 1991

[30] Foreign Application Priority Data

May 18, 1990 [CH] Switzerland ............... 1699/90

[51] Int. Cl.$^5$ ............... C09B 67/00; D06P 1/52; D06P 3/62
[52] U.S. Cl. ............... 8/555; 8/532; 8/552; 8/554; 8/558; 8/562; 8/680; 8/918
[58] Field of Search ............... 8/554, 555, 562

[56] References Cited

U.S. PATENT DOCUMENTS

| | | | |
|---|---|---|---|
| 4,304,567 | 12/1981 | Ballmann et al. | 8/543 |
| 4,390,342 | 6/1983 | Bruttel et al. | 8/524 |
| 4,500,321 | 2/1985 | Hugelshofer et al. | 8/527 |
| 4,523,924 | 6/1985 | Lacroix | 8/527 |
| 4,851,011 | 7/1989 | Lacroix et al. | 8/527 |

FOREIGN PATENT DOCUMENTS

| | | |
|---|---|---|
| 243939 | 11/1987 | European Pat. Off. . |
| 1619537 | 3/1971 | Fed. Rep. of Germany . |
| 58/186683 | 10/1983 | Japan . |
| 62/177287 | 8/1987 | Japan . |

OTHER PUBLICATIONS

Derwent Abstract 83-836469.
Derwent Abstract 87-254900.

*Primary Examiner*—A. Lionel Clingman
*Attorney, Agent, or Firm*—Marla J. Mathias; Edward McC. Roberts

[57] ABSTRACT

The invention relates to a process for the end-to-end dyeing of cellulosic fibres or cellulosic fibre blends with direct dyes by the pad dyeing process, which comprises padding said fibre materials with an aqueous liquor containing one or more deionized dyes and a migration inhibitor, then expressing the padded goods and subsequently fixing the dye thereon.

The process of the invention is suitable for dyeing textile cellulosic fibres or cellulosic fibre blends end-to-end in shades of good allround fastness properties.

11 Claims, No Drawings

PROCESS FOR THE END-TO-END DYEING OF CELLULOSIC FIBRES: DESALTED DIRECT DYE AND MIGRATION INHIBITOR

The present invention relates to a process for the end-to-end dyeing of textile cellulosic fibre materials with direct dyes by the pad dyeing process.

The pad dyeing process is a known process for dyeing cellulosic fibres by means of which large metrages of textile materials are dyed by impregnating said materials with the dye solution in a trough, in the shortest liquor ratio and normally with only one passage of the goods on the pad, in a short dyeing time, and subsequently fixing the dye on the fibre.

A known shortcoming of this process is the frequently observed tailing of the dyed materials (batches). By tailing/reversed tailing is meant the differences in strength and shade between the beginning and the end of the batch. If only one dye is used, tailing is apparent in differences in tinctorial strength, whereas in combination shade dyeing, changes in shade may also often occur.

By tailing is meant a decrease in tinctorial strength between the beginning and the end of a batch caused by a decrease in the concentration of dye in the trough. This impoverishment of the dye liquor is caused by dye absorption during the pad process. Differences in tinctorial strength and shade resulting from tailing occur especially when using dyes of medium to high substantivity, i.e. direct dyes, and, most frequently, when dyeing in light shades.

By reversed tailing is meant an increase in tinctorial strength between the beginning and the end of the batch caused by an increase in the dye concentration in the trough. This dye enrichment in the padding liquor is caused by a preferred water adsorption in the pad dyeing process. Differences in tinctorial strength and shade caused by reverse tailing occur when dyes of low substantivity are used, especially when dyeing in dark shades.

The measures so far taken to improve tailing have not gained acceptance in dyeing practice. Thus, for example, the proposal is made in DE-A 1 619 537 to add urea or thiourea to the padding liquor. But the 150 g of urea or thiourea added per liter of liquor pollutes the wastewaters to an extent which at the present time is no longer considered acceptable. Hence there is a need to improve tailing when pad dyeing with direct dyes.

Surprisingly, a novel process has now been found which permits the end-to-end dyeing of textile cellulosic fibres, especially in light shades, with direct dyes by the pad dyeing process in simple manner and without the aforementioned shortcomings.

Specifically, the present invention relates to a process for the end-to-end dyeing of cellulosic fibres or cellulosic fibre blends with direct dyes by the pad dyeing process, which comprises padding said fibre materials with an aqueous liquor containing one or more deionised dyes and a migration inhibitor, then expressing the padded goods and subsequently fixing the dye thereon.

The direct dyes suitable for use in the process of this invention are all conventional direct dyes, typically those listed in the Colour Index, 3rd edition (1971), Volume 2, on pages 2005 to 2478.

The known direct dyes are salt-containing by virtue of their synthesis and/or of the subsequent addition of diluents, and therefore must be deionised prior to use in the process of this invention.

Suitable deionising methods, especially membrane separation methods, such as ultrafiltration, reverse osmosis or dialysis, are disclosed, for example, in EP-A 0 059 782.

The liquid formulations of direct dyes obtained after deionisation and concentration by a suitable membrane separation method can be used in the process of the invention either direct or after prior conversion to the deionised powder form, typically by spray drying.

In the context of this invention, deionised dyes will generally be understood as meaning those dyes having a salt content of $\leq 2.5\%$, preferably $\leq 1\%$ and, most preferably, $\leq 0.5\%$, based on the weight of the dye.

The amount of dye used in the process of the invention will normally depend on the desired tinctorial strength, tailing being especially evident when dyeing in light shades (pastel shades), i.e. at a concentration of 0.05 g or less up to ca. 20 g per liter of liquor.

It is preferred to use padding liquors having a dye concentration of $\leq 5$ g/l, most preferably $\leq 3$ g/l, of liquor. The liquor may contain one or more dyes, typically a trichromatic mixture containing a yellow, red and blue dye.

Suitable migration inhibitors are known to the skilled person, for example from the practice of continuous dyeing, and also from pigment and vat dyeing. Suitable contenders are alginates, high molecular weight copolymers derived from acrylic acid or acrylamide with other monomers, alkyl sulfates, ethylene oxide adducts, polyglycol ethers, oxypropylation products, cellulose or starch ethers, locust bean gum ethers, carboxymethyl celluloses, modified polysaccharides, polyvinyl alcohols or other polyelectrolytes.

Representative examples of effective migration inhibitors are listed, for example, in Textilhilfsmittelkatalog 1986, Konradin-Verlag Robert Kohlhammer, Leinfelden-Echterdingen, on pages 86–89.

It is preferred to use a polyacrylate as migration inhibitor in the process of this invention. The polyacrylate derivative is used typically in the form of an aqueous solution.

The migration inhibitor is normally added in an amount of 0.5 to 10 g, preferably of 1 to 7.5 g and, most preferably, of 1 to 5 g, per liter of liquor.

The padding liquor can contain conventional auxiliaries such as anionic agents having levelling, wetting and/or dispersing properties. Suitable levelling agents, wetting agents or dispersants are known per se or can be obtained in a manner which is known per se. Such anionic agents are typically: salts of long-chain alkanesulfonic acids such as $C_{11}$–$C_{18}$alkylsulfonates, Turkey red oils, alkylbenzylsulfonates such as salts of dodecylbenzenesulfonic acids, alkyl- and benzylnaphthalenesulfonates, alkylaryldisulfonates, substituted naphthalenesulfonic acids, condensed phenol- or naphtholsulfonic acids, fatty alkylsulfates, fatty acid amide sulfonic acids, monosulfates of fatty amine polyglycol ethers, alkylpolyglycol ether sulfates, polyglycol ether derivatives of alkyl heterocyclylsulfonates, for example polyglycol ether derivatives of sulfonated alkylbenzimidazoles, condensates of protein fatty acid and formaldehyde and of naphthalenesulfonic acid and formaldehyde, and esters of inorganic acids.

The padding liquors of this invention will preferably contain a conventional anionic wetting agent, typically an ester of an inorganic acid. If the padding liquor contains an anionic levelling agent, then it is preferred to use a polyglycol ether derivative of a sulfonated alkylbenzimidazole.

The amount of the aforementioned anionic agents in the padding liquor can vary over a wide range. An amount of 0.2–10 g, preferably 0.25–5 g and, most preferably, 0.4–1.5 g, per liter of liquor, has been found very suitable. A single anionic agent or a mixture of different anionic agents will typically be used.

The padding liquors are conveniently prepared by dissolving the dye or by addition of the liquid dye formulation and also by addition of the anionic levelling agent, with the optional addition of further auxiliaries of the kind cited above.

The liquor is usually applied to the fabric at normal or moderately elevated temperature, i.e. in the range from 15° to 40° C., and preferably at room temperature.

Dye fixation is effected by conventional methods, for example with steam (pad-steam process), by batching at normal to moderately elevated temperature, i.e. in the range from ca. 15° to 40° C. (cold pad-batch method) or by microwaves.

If dye fixation is effected by the pad steam process, then the requisite fixing time and temperature will be contingent on the textile material and the dye employed. In general, steaming times in saturated steam of 30 seconds to 15 minutes at 100°–105° C. suffice to obtain a level and optimum dye fixation. Fixation by high temperature or dry heat steaming is carried out typically for 20 seconds to 8 minutes at 105°–108° C. The dyes are fixed on blended fabrics such as polyester/cellulose blends at 100°–200° C., preferably 150°–200° C., and the fixing time is typically from 10 seconds to 10 minutes. If desired, the textile material is dried prior to fixation.

For microwave fixation, the padded textile material is hung in a water-containing vessel, which is then placed for a specific time, typically 15 seconds to 10 minutes, preferably 30 seconds to 5 minutes, in a commercial microwave drier.

It is preferred, however, to effect fixation by the cold pad-batch method and to roll up and batch the padded and expressed fabric for typically 6 to 48 hours, preferably 10 to 24 hours, at room temperature.

After the dyeing process, the dyed material is rinsed in conventional manner. This washing procedure may comprise treating the substrate at 40° C. to boiling temperature in a solution which contains soap or a synthetic detergent, or it may consist of treatment with cold water and addition of salt. The washing off may be followed by aftertreatments, for example a conventional aftertreatment to improve the wetfastness properties with a fixing agent, or a resin finish.

Suitable textile cellulosic fibre materials are those materials which consist partially of cellulose. Typical examples are natural fibre materials such as mercerised or bleached cotton or linen (bleached), regenerated fibre materials such as viscose, polynosic and cuprammonium staple, or cellulosic fibre blends such as polyester/cotton blends. Mainly woven and knitted goods or webs made from these fibres are used.

A preferred embodiment of the present invention relates to a process for the end-to-end dyeing of textile fibre materials made of mercerised or bleached cotton or of textile polyester/cotton blends with direct dyes by the pad dyeing process, which comprises padding said fibre materials with an aqueous liquor containing ≦5 g/l of dye having a salt content of ≦2.5%, based on the weight of the dye, and 1 to 7.5 g/l of a polyacrylate as migration inhibitor, then expressing the padded goods and subsequently fixing the dye on the fibre by the cold pad-batch method.

A particularly preferred embodiment of the process of the invention relates to a process for the end-to-end dyeing of textile fibre materials made of mercerised or bleached cotton with direct dyes by the pad dyeing process, which comprises padding said fibre materials with an aqueous liquor containing ≦3 g/l of dye having a salt content of ≦1%, based on the weight of the dye, and 1 to 5 g/l of an aqueous solution of a polyacrylic acid derivative as migration inhibitor and a total amount of 0.25 to 5 g/l of one ore more anionic wetting and/or levelling agents, then expressing the padded goods and subsequently rolling up and batching the dyed material for 6 to 48 hours.

The invention is illustrated by the following Examples in which parts and percentages are by weight.

EXAMPLE 1

Bleached cotton cretonne fabric is padded to 80% expression with a padding liquor of the following composition:

0.5 g/l of the deionised yellow dye C.I. Direct Yellow 106, Const. No. 40300, salt content 1.0%
0.5 g/l of the deionised red dye C.I. Direct Red 89, salt content <0.1%
0.5 g/l of the deionised blue dye C.I. Direct Blue 85, salt content <0.1%.
(deionisation of the dyes by dialysis)
1 g/l of an anionic wetting agent (ester of an inorganic acid)
5.0 g/l of a migration inhibitor (aqueous solution of a polyacrylic acid derivative)
0.5 g/l of an anionic levelling agent (polyglycol ether derivative of a sulfonated alkylbenzimidazole).

The padded goods are rolled up and batched for 16 hours at room temperature with constant rotation. The fabric is then rinsed and given an aftertreatment with a fresh liquor containing 40 g/l of a fixing agent based on polyethylene polyamine.

The fabric is dyed end-to-end in a brown shade of good allround fastness properties.

EXAMPLE 2

The procedure as described in Example 1 is repeated, using 0.1 g/l instead of 0.5 g/l of the yellow, red and blue dyes. Fabric which is dyed end-to-end in a brown shade of good allround fastness properties is likewise obtained.

EXAMPLE 3

Bleached cotton cretonne fabric is padded to 80% expression with a padding liquor of the following composition:

0.5 g/l of the deionised yellow dye C.I. Direct Yellow 39, salt content ≦1.0%
(deionisation of the dyes by dialysis)
1 g/l of an anionic wetting agent (ester of an inorganic acid)
5.0 g/l of a migration inhibitor (aqueous solution of a polyacrylic acid derivative)
0.5 g/l of an anionic levelling agent (polyglycol ether-derivative of a sulfonated alkylbenzimidazole).

The padded goods are rolled up and batched for 16 hours at room temperature with constant rotation. The fabric is then rinsed.

The fabric is dyed end-to-end in a yellow shade of good allround fastness properties.

EXAMPLE 4

Bleached cotton cretonne fabric is padded to 80% expression with a padding liquor of the following composition:

```
0.5 g/l of the deionised blue dye C.I. Direct Blue 199,
    salt content ≦1.0%
    (deionisation of the dyes by dialysis)
  1 g/l of an anionic wetting agent (ester of an inorganic acid)
5.0 g/l of a migration inhibitor (aqueous solution of
    a polyacrylic acid derivative)
0.5 g/l of an anionic levelling agent (polyglycol ether-
    derivative of a sulfonated alkylbenzimidazole).
```

The padded goods are rolled up and batched for 16 hours at room temperature with constant rotation. The fabric is then rinsed and given an aftertreatment with a fresh liquor containing 40 g/l of a fixing agent based on polyethylene polyamine.

The fabric is dyed end-to-end in a blue shade of good allround fastness properties.

EXAMPLES 5-9

The procedure as described in either Example 3 or 4 is repeated, using in place of the dyes therein equivalent amounts of the dyes listed in the following Table. End-to-end dyeings of good allround fastness properties are likewise obtained.

TABLE

| Example | Dye |
|---|---|
| 5 | Colour Index Direct Blue 71, Const. No. 34140 |
| 6 | Colour Index Direct Blue 78, Const. No. 34200 |
| 7 | Colour Index Direct Blue 85 |
| 8 | Colour Index Direct Blue 90 |
| 9 | Colour Index Direct Red 23, Const. No. 29160 |
| 10 | Colour Index Direct Red 80, Const. No. 35780 |
| 11 | Colour Index Direct Red 89 |
| 12 | Colour Index Direct Red 224 |
| 13 | Colour Index Direct Yellow 50, Const. No. 29025 |
| 14 | Colour Index Direct Yellow 106, Const. No. 40300 |
| 15 | Colour Index Direct Yellow 130 |
| 16 | Colour Index Direct Yellow 142 |
| 17 | Colour Index Direct Yellow 169 |
| 18 | Colour Index Direct Black 62 |
| 19 | Colour Index Direct Black 112 |

What is claimed is:

1. A process for the end-to-end dyeing of cellulosic fibres or cellulosic fibre blends with direct dyes by the pad dyeing process, which comprises padding said fibre materials with an aqueous liquor containing one or more deionised direct dyes having a salt content of 2.5% or less by weight of the dye and a migration inhibitor, then expressing the padded goods and subsequently fixing the dye thereon, said migration inhibitor selected from the group consisting of alginates, polyacrylates, copolymers derived from acrylic acid or acrylamide with other comonomers, alkyl sulfates, ethylene oxide adducts, polyglycol ethers, oxypropylation products, cellulose or starch ethers, locust bean gum ethers, carboxymethyl celluloses, modified polysaccharides, polyvinyl alcohols and other polyelectrolytes.

2. A process according to claim 1, wherein the direct dyes have a salt content of ≦1% based on the weight of the dye.

3. A process according to claim 1, wherein the dye concentration in the padding liquor is ≦5 g per liter of liquor.

4. A process according to claim 1, wherein the migration inhibitor is present in the padding liquor in a concentration of 0.5 to 10 g per liter of liquor.

5. A process according to claim 1, wherein the padding liquor additionally contains one or more different anionic agents having levelling, wetting and/or dispersing properties.

6. A process according to claim 1, wherein fixation of the dye on the fibre is effected by the cold pad-batch method.

7. A process according to claim 6, wherein the padded and expressed goods are rolled up and batched for 6 to 48 hours at room temperature.

8. A process according to claim 1, wherein fixation of the dye on the fibre is effected by the pad-steam method.

9. A process according to claim 1 for dyeing textile fibre materials made of mercerised cotton or bleached cotton, linen, viscose, polynosic or cuprammonium staple, or textile polyester/cotton blends.

10. A process for the end-to-end dyeing of textile fibre materials made of mercerised or bleached cotton or of textile polyester/cotton blends with direct dyes by the pad dyeing process, which comprises padding said fibre materials with an aqueous liquor containing ≦5 g/l of dye having a salt content of ≦2.5%, based on the weight of the dye, and 1 to 7.5 g/l of a polyacrylate as migration inhibitor, then expressing the padded goods and subsequently fixing the dye on the fibre by the cold pad-batch method.

11. A process for the end-to-end dyeing of textile fibre materials made of mercerised or bleached cotton with direct dyes by the pad dyeing process, which comprises padding said fibre materials with an aqueous liquor containing ≦3 g/l of dye having a salt content of ≦1%, based on the weight of the dye, and 1 to 5 g/l of an aqueous solution of a polyacrylic acid derivative as migration inhibitor and a total amount of 0.25 to 5 g/l of one ore more anionic wetting and/or levelling agents, then expressing the padded goods and subsequently rolling up and batching the material for 6 to 48 hours.

* * * * *